United States Patent [19]

Yoshitsugu

[11] 4,383,704
[45] May 17, 1983

[54] OCCUPANT PROTECTIVE DEVICE
[75] Inventor: Noritada Yoshitsugu, Toyota, Japan
[73] Assignee: Toyota Jidosha Kogyo Kabushiki Kaisha, Toyota, Japan
[21] Appl. No.: 198,666
[22] Filed: Oct. 20, 1980
[30] Foreign Application Priority Data
Jan. 30, 1980 [JP] Japan .......................... 55-009865[U]
[51] Int. Cl.³ ............................................. B62D 21/02
[52] U.S. Cl. .................................................. 280/750
[58] Field of Search ................................ 280/750, 751
[56] References Cited
U.S. PATENT DOCUMENTS 3,938,821  2/1976  Haas ..................................... 280/750
4,061,365  12/1977  Nagano ................................ 280/751
4,194,762  3/1980  Sudo .................................... 280/751
4,241,937  12/1980  Eggen .................................. 280/750

Primary Examiner—Joseph F. Peters, Jr.
Assistant Examiner—Kenneth R. Rice
Attorney, Agent, or Firm—Parkhurst & Oliff

[57] ABSTRACT

Provided at the occupant's side of a steering post is an energy absorbing knee protector, which is normally covered by a knee panel, whereby the occupant does not observe and contact the knee protector. In an emergency of the vehicle, if the knees of the occupant collide with the knee panel to deform the same, the knee panel imparts an energy of collision generated in the knees to the knee protector by deforming the same, so that the energy of collision can be effectively absorbed.

8 Claims, 4 Drawing Figures

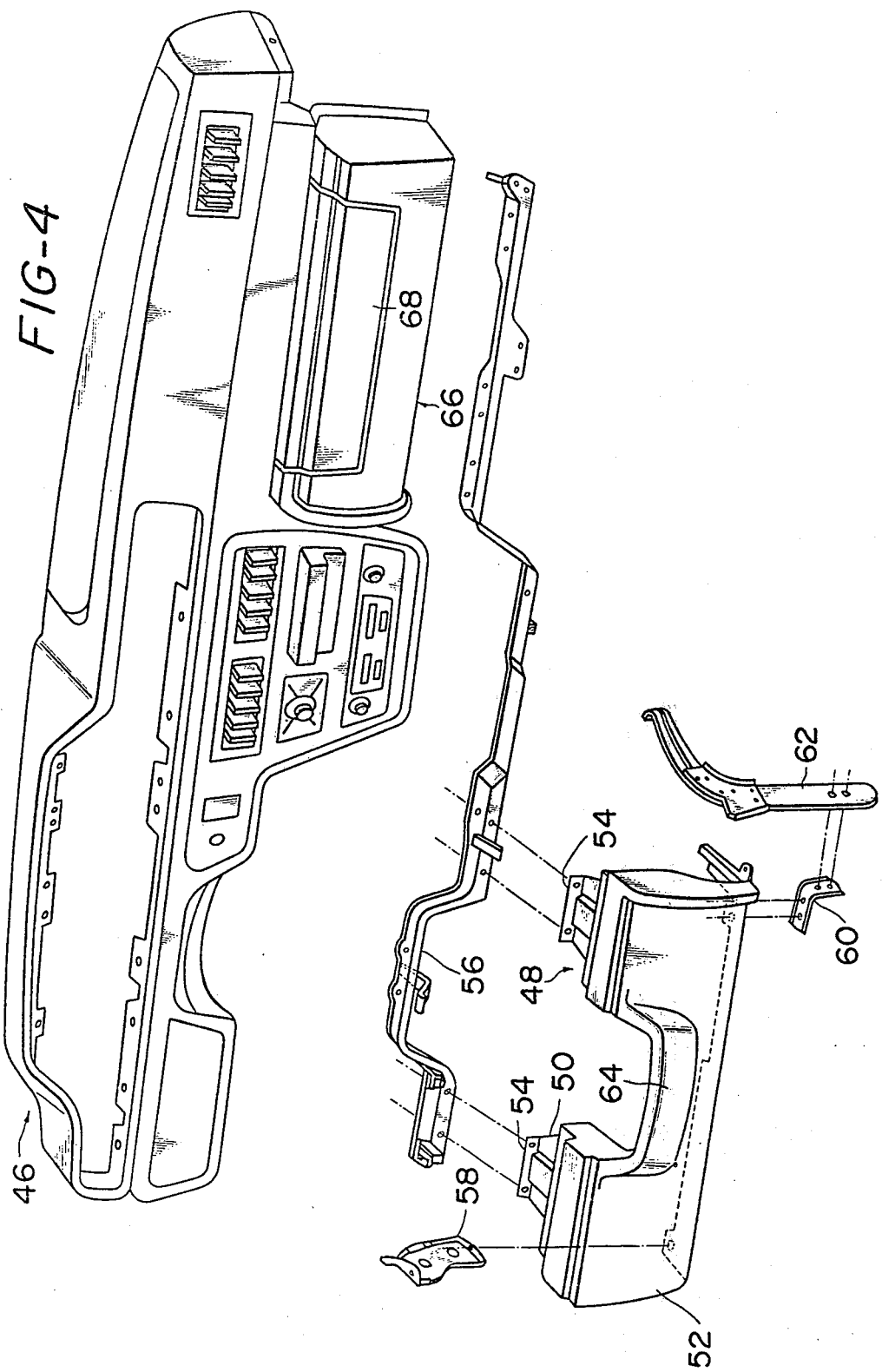

OCCUPANT PROTECTIVE DEVICE

BACKGROUND OF THE INVENTION

1. Field of the Invention

This invention relates to an occupant protective device for protecting an occupant in an emergency such as a collision of a vehicle, and more particularly to an occupant protective device applicable to a motor vehicle provided with a seatbelt system for moderating the forces of collision acting on the knees of an occupant generated in a collision.

2. Description of the Prior Art

Heretofore, there have been widely used seatbelt systems for protecting the occupant in an emergency of the vehicle. However, a disadvantage with conventional seatbelt systems is that before the occupant is reliably restrained by the seatbelt system in an emergency the knees of the occupant collide with the body of the vehicle, particularly against a steering post and are injured. This is because the distance between the knees of the occupant and the steering post is short.

Furthermore, a two-point seatbelt system in which the webbing extends substantially obliquely over the upper half body of the occupant is inferior in occupant restraining performance to a general three-point seatbelt system, and hence, in using the former there is a higher possibility that the knees of the occupant will collide with the steering post than in using the latter. For this reason, there has been proposed a knee panel provided between the knees of the occupant and the steering post for serving as a protective device to absorb the energy of collision generated in the knees of the occupant.

However, in the protective device, the knee panel should deform to a considerable extent to reliably absorb the energy generated in the knees of the occupant. In order to secure a space for the deformation, the knee panel bulges out toward the occupant to a considerable extent in the vicinity of the steering post. Consequently, there are disadvantages in that the occupant contacts the bulging knee panel when entering or leaving the vehicle and the bulging knee panel interferes with pedal operation for a brake pedal and the like during normal running of the vehicle.

SUMMARY OF THE INVENTION

The present invention has been developed to obviate the above described disadvantages and has as its object the provision of an occupant protective device which does not protrude toward the occupant to interfere with the comfort of the occupant, and is capable of absorbing the energy of collision generated in the lower half body of the occupant protected by a seatbelt system in an emergency of the vehicle.

The occupant protective device according to the present invention, is of such an arrangement that a knee panel is provided at the lower portion of an instrument panel so that the knee panel does not protrude to any large extent into the occupant compartment, and a knee protector is interposed between the knee panel and a steering post to absorb the energy of collision, whereby when the knees of an occupant collide with the knee panel to deform same in a collision of a vehicle, the knees of the occupant collide with the knee protector through the knee panel or directly collide with the knee protector while breaking the knee panel down, so that the energy of collision generated in the occupant can be absorbed.

Description will hereunder be given of one embodiment of the present invention with reference to the drawings.

BRIEF DESCRIPTION OF THE DRAWINGS

FIG. 4 is a disassembled perspective view showing the relationship between the knee panel and the instrument panel.

DESCRIPTION OF THE PREFERRED EMBODIMENT

Figure 1:
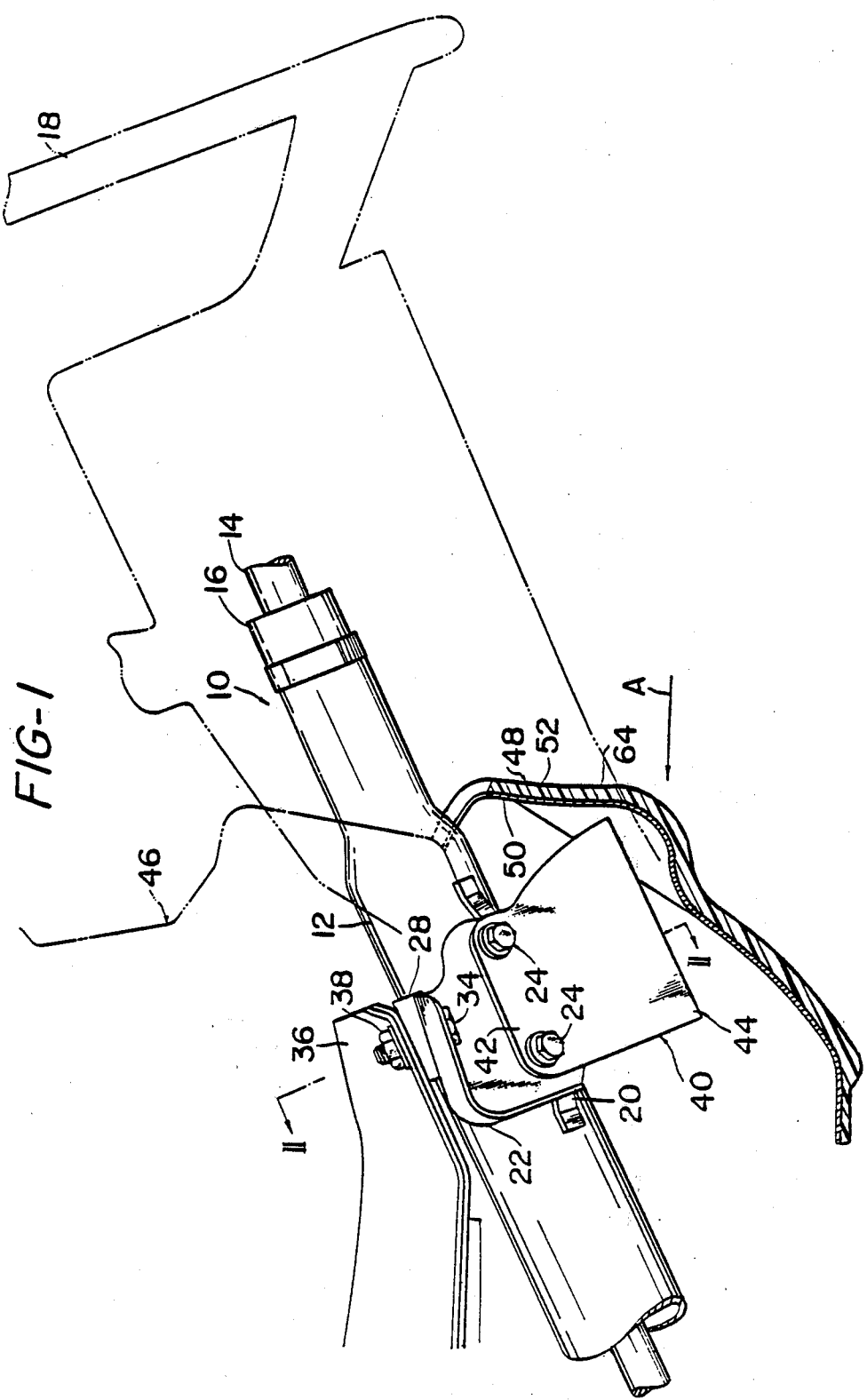
FIG. 1 is a front view, partly sectional, showing the embodiment of the occupant protective device according to the present invention as viewed in the crosswise direction of the vehicle.

As shown in FIG. 1, a steering post assembly 10 of the vehicle is constructed such that a steering shaft 14 is pivotally supported in a post tube 12 through a bearing 16 and the like and coaxially with the post tube 12, and a steering wheel 18 is solidly secured to the upper end of the steering shaft 14, whereby a steering force applied by the occupant to the steering wheel 18 is imparted to wheels through a gear box, not shown, connected to the lower end of the steering shaft 14.

Figure 3:
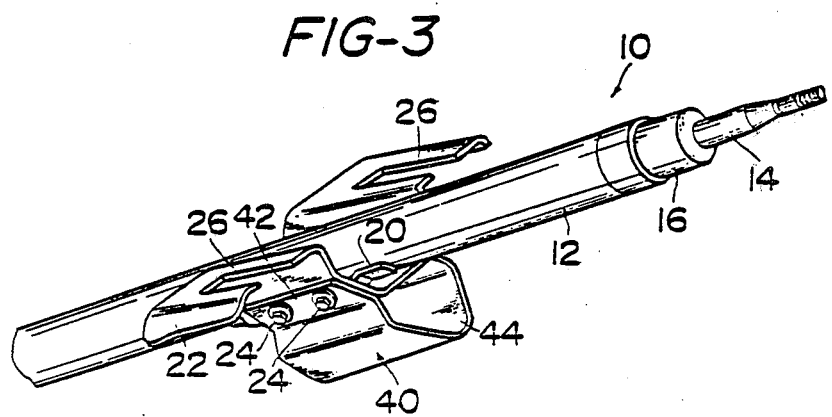
FIG. 3 is a perspective view showing the assembled state of the steering post.

A pair of bolt studs 20 are weldedly secured at opposite ends thereof to an outer periphery of an axially intermediate portion of the post tube 12, and an intermediate portion of a breakaway bracket 22 is threadably tightened to intermediate portions of the stud bolts 20 through mounting bolts 24. The breakaway bracket is formed on planar portions at opposite ends thereof with rectangular cutouts 26, respectively, which are communicated with the outside in the direction of the steering wheel 18 (FIG. 3). Inserted into the cutouts 26 are blocks 28 through grooves 30 formed therein, and the blocks 28 are movable relative to the breakaway bracket 22 in a direction substantially parallel with the axis of the steering shaft 14.

The blocks 28 are each provided with a hole 32 through which a mounting bolt 34 is threadably coupled to a nut 38 welded to a pedal bracket 36, whereby the blocks 28 are solidly secured to the pedal bracket 36, which in turn is fixed on the vehicle.

Consequently, the intermediate portion of the steering post assembly 10 is secured to the pedal bracket 36 through the breakaway bracket 22. When the occupant collides with the steering wheel 18 in an emergency of the vehicle, the breakaway bracket 22, which is movable relative to the blocks 28, moves forward in the vehicle, so that the breakaway bracket 22 can absorb the energy of collision generated in the occupant. In addition, an energy absorbing mechanism, not shown, is provided at the lower portion of the steering post assembly 10.

Figure 2:
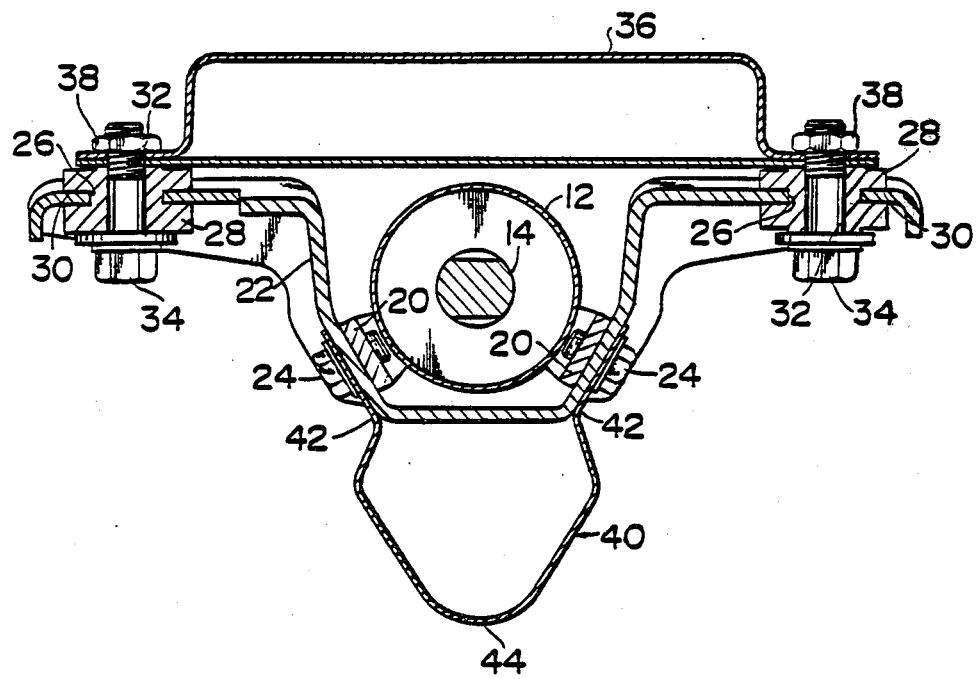
FIG. 2 is a section view taken along the line II—II in FIG. 1.

A knee protector 40 made of thin sheet metal is solidly secured to the breakaway bracket 22. The knee protector 40 is substantially U-shaped as shown in FIG. 2 as viewed from the steering wheel 18, and opposite legs 42 thereof are tightened to the post tube 12 together with the breakaway bracket 22 through the mounting bolts 24. Additionally, as shown in FIG. 1, a bent center 44 of the knee protector 40 is wider than the opposite legs 42 as viewed in the crosswise direction of the vehicle. When a high impact force is applied to the knee protector 40 substantially in the horizontal direction, i.e., the direction indicated by arrow A in FIG. 1, the bent center 44 deforms and moves in a direction of the post tube 12, so that the energy of collision can be absorbed.

As shown in FIG. 1, the knee protector 40 is covered by a knee panel 48 provided at the lower portion of an instrument panel 46, whereby the knee protector 40 cannot be seen from the inside of the occupant compartment. The knee panel 48 is constructed such that a pad 52 made of soft synthetic resin material is attached onto the occupant compartment's side of a thin sheet 50, and adapted to absorb the energy of collision by deforming when the knees of the occupant collide therewith in an emergency of the vehicle. At the time of the deformation, the thin sheet 50 is brought into abutting contact with the knee protector 40.

As shown in the disassembled view in FIG. 4, upper end bent portions 54 of the thin sheets 50 of the knee panel 48 are threadably tightened to an instrument panel reinforcement 56 solidly secured to the vehicle, the lower end portion of the knee panel 48 is threadably fastened inside the occupant compartment to a front pillar, not shown, of the vehicle through an instrument panel extension 58, and the compartment's side of the lower end portion of the knee panel 48 is threadably fastened to a brace plate 62 constituting a part of a cowl panel (or window screen panel) through a bracket 60, whereby the knee panel 48 is secured to the vehicle.

Furthermore, an upper end portion of the knee panel 48, which is intermediate in the crosswise direction, is formed into a bulging portion 64 bulging out into the occupant compartment, whereby the bulging portion 64 and the instrument panel 46 define a clearance for receiving the steering post assembly 10, and further, the knee panel 48 does not contact the knee protector 40 during normal running of the vehicle.

In addition, another knee panel 66 is provided in front of an assistant driver's seat to protect an occupant seated in the assistant driver's seat in the same manner as in the driver's seat. However, an impact absorbing stroke is satisfactorily provided for the assistant driver's seat due to lack of the steering post, so that a knee protector is not needed. Additionally, the knee panel 66 is provided with a glove box compartment 68.

In this embodiment with the arrangement as described above, the steering operation can be effected by the occupant by turning the steering wheel 18 during normal running of the vehicle. During the steering and pedal operation, the knees of the occupant do not unnecessarily contact the knee panel 48. More specifically, the knee panel 48 secured to the lower portion of the instrument panel 46 does not prominently protrude into the occupant compartment, so as not to interfere with the freedom of movement of the occupant in the occupant compartment.

When the vehicle gets into an emergency such as a collision, the occupant is restrained by the seatbelt system, not shown, to be prevented from being violently thrown out in the direction of collision, so that the occupant can be protected from colliding with dangerous obstacles. However, until the occupant is securely restrained by the seatbelt system, the occupant moves to some extent in the direction of collision, whereby the knees of the occupant collide with the knee panel 48 (in a direction indicated by arrow A in FIG. 1). The knee panel 48, however, absorbs the energy of collision by deforming, to a large extent, forwardly in the vehicle. Hereupon, the knee panel 48 thus deformed contacts the knee protector 40 disposed in front of the knee panel 48 to deform the knee protector 40, thereby absorbing more of the energy of collision in addition to the knee panel 48. Those deforming strokes, being not large though, effectively absorb the energy of collision generated in the knees of the occupant, thus eliminating the possibilities in harming the occupant.

While the above described embodiment has been described as using a thin sheet material being bent into a U-shape as the knee protector, it is to be understood that the invention is not limited to the specific form of the knee protector and that other impact absorbing members are applicable including a honeycomb structure made of readily deformable materials such as aluminum and a block material made of synthetic resin materials such as polyurethane.

Furthermore, the knee protector is not limited to the specific form of being solidly secured to the steering post. The knee protector may be secured to the breakaway bracket, pedal bracket or the like provided that the impact absorbing material is interposed substantially between the steering post and the knee panel.

As has been described hereinabove, the occupant protective device according to the present invention is of such an arrangement that the knee panel is provided at the lower portion of the instrument panel and the knee protector is mounted between the knee panel and the steering post, and hence, can offer outstanding advantages that the energy of collision generated in the lower half body of the occupant in an emergency of the vehicle can be absorbed without disturbing the comfort of the occupant.

What is claimed is:

1. An occupant protective device for moderating a force of collision acting on the knees of an occupant in a vehicle having a steering post, an occupant compartment and an instrument panel, said occupant protective device comprising:
    a deformable substantially U-shaped thin sheet knee protector positioned in front of the knees of the occupant;
    a deformable knee panel extending from the instrument panel and disposed between said knee protector and the knees of the occupant for covering said knee protector;
    a breakaway bracket to which said knee protector is secured, said breakaway bracket solidly securing the steering post to a vehicle body and adapted to fall off the vehicle body in an emergency situation;
    said knee protector having a bent center which is deformable;
    the knees of the occupant being protected in an emergency situation when the knees push against said knee panel and deform said knee protector.

2. An occupant protective device as set forth in claim 1, wherein both opposite legs of said knee protector together with the steering post are tightened to said break away bracket through bolts.

3. An occupant protective device as set forth in claim 1, wherein said knee panel comprises a thin sheet metal and a pad made of soft synthetic resin material attached to the occupant compartment side of said thin sheet, said thin sheet being normally separated from said knee protector and contacting said knee protector to give a deforming force thereto when the knees of the occupant move forward in an emergency situation of the vehicle.

4. An occupant protective device as set forth in claim 3, wherein upper end portions of said knee panel are threadably tightened to an instrument panel reenforcement which is solidly secured to the vehicle.

5. An occupant protective device as set forth in claim 1, wherein a lower end portion of said knee panel is threadably tightened, at the outer side thereof, to the inner side of the occupant compartment of the vehicle.

6. An occupant protective device as set forth in claim 1, wherein a portion of said knee panel is formed into a bulging portion bulging out into the occupant compartment, whereby said bulging portion and the instrument panel define a clearance for receiving the steering post.

7. An occupant protective device for moderating a force of collision acting on the knees of an occupant in a vehicle having a steering post and an instrument panel, said occupant protective device comprising:
- a deformable substantially U-shaped thin sheet knee protector positioned in front of the knees of the occupant;
- a deformable knee panel extending from the instrument panel and disposed between said knee protector and the knees of the occupant for covering said knee protector;
- a breakaway bracket to which said knee protector is secured, said breakaway bracket solidly securing the steering post to the vehicle and adapted to fall off the vehicle in an emergency situation;
- said knee protector having a bent center which is deformable;
- both opposite legs of said knee protector together with the steering post are secured to said breakaway bracket;
- said bent center of said knee protector is wider than said opposite legs as viewed in the crosswise direction of the vehicle;
- the knees of the occupant being protected in an emergency situation when the knees push against said knee panel and deform said knee protector.

8. An occupant protective device for absorbing an energy of collision generated in knees of an occupant in an emergency situation of a vehicle for use together with a seatbelt system which is also an occupant protective device in an emergency situation of the vehicle, said device comprising:
- a breakaway bracket secured to a vehicle in a manner to be movable forward in the vehicle when receiving an energy of collision generated in the occupant in a collision of the vehicle;
- a steering post secured to said breakaway bracket, transmitting a force of collision from the occupant to said breakaway bracket and being movable along with said breakaway bracket;
- a substantially deformable U-shaped knee protector, opposite legs of which are solidly secured to said breakaway bracket and an intermediate bent portion of which protrudes toward the occupant; and
- a deformable knee panel provided to cover said deformable knee protector, said knee panel being normally separated from the knee protector and deforming to contact said deformable knee protector when the knees of the occupant move forward in an emergency situation of the vehicle, whereby a force of collision generated in the knees is imparted to said deformable knee protector after by deforming said deformable knee protector, so that the impact energy generated in the occupant can be effectively absorbed.

* * * * *